United States Patent
Gurram et al.

(10) Patent No.: US 7,340,395 B2
(45) Date of Patent: Mar. 4, 2008

(54) MULTIPLE SPEECH RECOGNITION ENGINES

(75) Inventors: Rama Gurram, San Jose, CA (US); Frances James, Sunnyvale, CA (US)

(73) Assignee: SAP Aktiengesellschaft, Walldorf (DE)

( * ) Notice: Subject to any disclaimer, the term of this patent is extended or adjusted under 35 U.S.C. 154(b) by 848 days.

(21) Appl. No.: 10/830,313

(22) Filed: Apr. 23, 2004

(65) Prior Publication Data

US 2005/0240404 A1 Oct. 27, 2005

(51) Int. Cl.
*G10L 15/22* (2006.01)

(52) U.S. Cl. ..................................... 704/231
(58) Field of Classification Search ................. 704/231
See application file for complete search history.

(56) References Cited

U.S. PATENT DOCUMENTS

| | | | |
|---|---|---|---|
| 5,933,804 A | 8/1999 | Huang et al. | 704/244 |
| 6,801,604 B2 * | 10/2004 | Maes et al. | 379/88.17 |
| 6,834,265 B2 * | 12/2004 | Balasuriya | 704/270.1 |
| 2002/0046023 A1 | 4/2002 | Fujii et al. | |
| 2002/0091518 A1 | 7/2002 | Baruch et al. | |
| 2003/0105623 A1 | 6/2003 | Cyr et al. | |

* cited by examiner

*Primary Examiner*—Susan McFadden
(74) *Attorney, Agent, or Firm*—Fish & Richardson P.C.

(57) ABSTRACT

A system having multiple speech recognition engines, each operable to recognize spoken data, is described. A speech recognition engine manager detects the speech recognition engines, and selects at least one for recognizing spoken input from a user, via a user interface. In this way, a speech recognition engine that is particularly suited to a current environment may be selected. For example, a speech recognition engine that is particularly suited for, or preferred by, the user may be selected, or a speech recognition engine that is particularly suited for a particular type of interface, interface element, or application, may be selected. Multiple ones of the speech recognition engines may be selected and simultaneously maintained in an active state, by maintaining a session associated with each of the engines. Accordingly, users' experience with voice applications may be enhanced, and, in particular, users with physical disabilities may more easily interact with software applications.

17 Claims, 5 Drawing Sheets

MULTIPLE SPEECH RECOGNITION ENGINES

TECHNICAL FIELD

This description relates to speech recognition engines.

BACKGROUND

Much of software used in business today takes the form of complex graphical user interfaces (GUIs) associated with applications. Complex GUIs allow users to perform many tasks simultaneously while maintaining the context of the rest of their work; however, such systems are often mouse- and keyboard-intensive, which can be problematic or even impossible to use for many people, including those with physical disabilities.

Speech recognition allows a user to provide input to an application using voice. Just as typing on a keyboard or clicking using a mouse may provide input to an application, speech recognition allows a user to provide spoken input to an application. The speech recognition process may be performed by a speech recognition engine. A speech recognition engine may be used to process spoken input and translate it into a form that may be used and understood by an application.

SUMMARY

In one aspect, a first speech recognition engine is operable to recognize spoken data, a second speech recognition engine is operable to recognize spoken data, and a user interface is operable to receive spoken input from a user. A speech recognition engine manager including a speech recognition engine selector is operable to select one of the first speech recognition engine and the second speech recognition engine for recognizing the spoken input from the user.

Implementations may include one or more of the following features. For example, the speech recognition engine manager may further comprise a speech recognition engine detector operable to detect available speech recognition engines, including the first speech recognition engine and the second speech recognition engine. The speech recognition engine selector may be operable to select one of the first speech recognition engine and the second speech recognition engine, based on selection information.

The selection information may include a preference of the user with respect to the first speech recognition engine and the second speech recognition engine. The selection information may include predetermined heuristics associated with an operation of the first speech recognition engine and the second speech recognition engine.

The predetermined heuristics may relate to a type of speech recognition associated with the first speech recognition engine or the second speech recognition engine. The predetermined heuristics may relate to misrecognitions associated with the first speech recognition engine or the second speech recognition engine. The selection information may include information related to the user interface with respect to the first speech recognition engine and the second speech recognition engine.

The speech recognition engine manager may use application program interface (API) libraries to interact with the available speech recognition engines. The speech recognition engine manager may include a session manager operable to manage a first session with the first speech recognition engine and a second session with the second speech recognition engine, where the first and second session overlap in time.

In another aspect, available speech recognition engines operable to interpret spoken data received in association with a user interface are determined. A chosen one of the available speech recognition engines is selected to receive spoken input from a user, via the user interface. The chosen speech recognition engine is used to interpret the spoken input from the user.

Implementations may included one or more of the following features. For example, selecting the chosen speech recognition engine may include accessing selection information associated with the user, the user interface, or the available speech recognition engines.

A plurality of the available speech recognition engines may be selected, and a session for each of the selected plurality of available speech recognition engines may be maintained. The interpreted spoken input may be forwarded to the user interface via a voice-enabled portal, so that the interpreted spoken input is displayed as text in association with the user interface.

In another aspect, a speech recognition engine manager includes a speech recognition engine detector operable to determine available speech recognition engines. The speech recognition engine manager also includes a speech recognition engine selector operable to select one of the available speech recognition engines for receiving spoken input from a user of a user interface, based on selection information associated with the user, the user interface, or the available speech recognition engines.

Implementations may included one or more of the following features. For example, the speech recognition engine manager may include a session manager operable to manage overlapping sessions between the user and at least two of the available speech recognition engines. The session manager may be operable to switch between a first session and a second session, based on a current state of the selection information.

The selection information may includes preference information associated with the user with respect to the available speech recognition engines. The selection information may include predetermined heuristics associated with the user interface or the available speech recognition engines. The predetermined heuristics may relate to previous misrecognitions by the available speech recognition engines identified with respect to the user.

The details of one or more implementations are set forth in the accompanying drawings and the description below. Other features of particular implementations will be apparent from the description, the drawings, and the claims.

DETAILED DESCRIPTION

Figure 1:
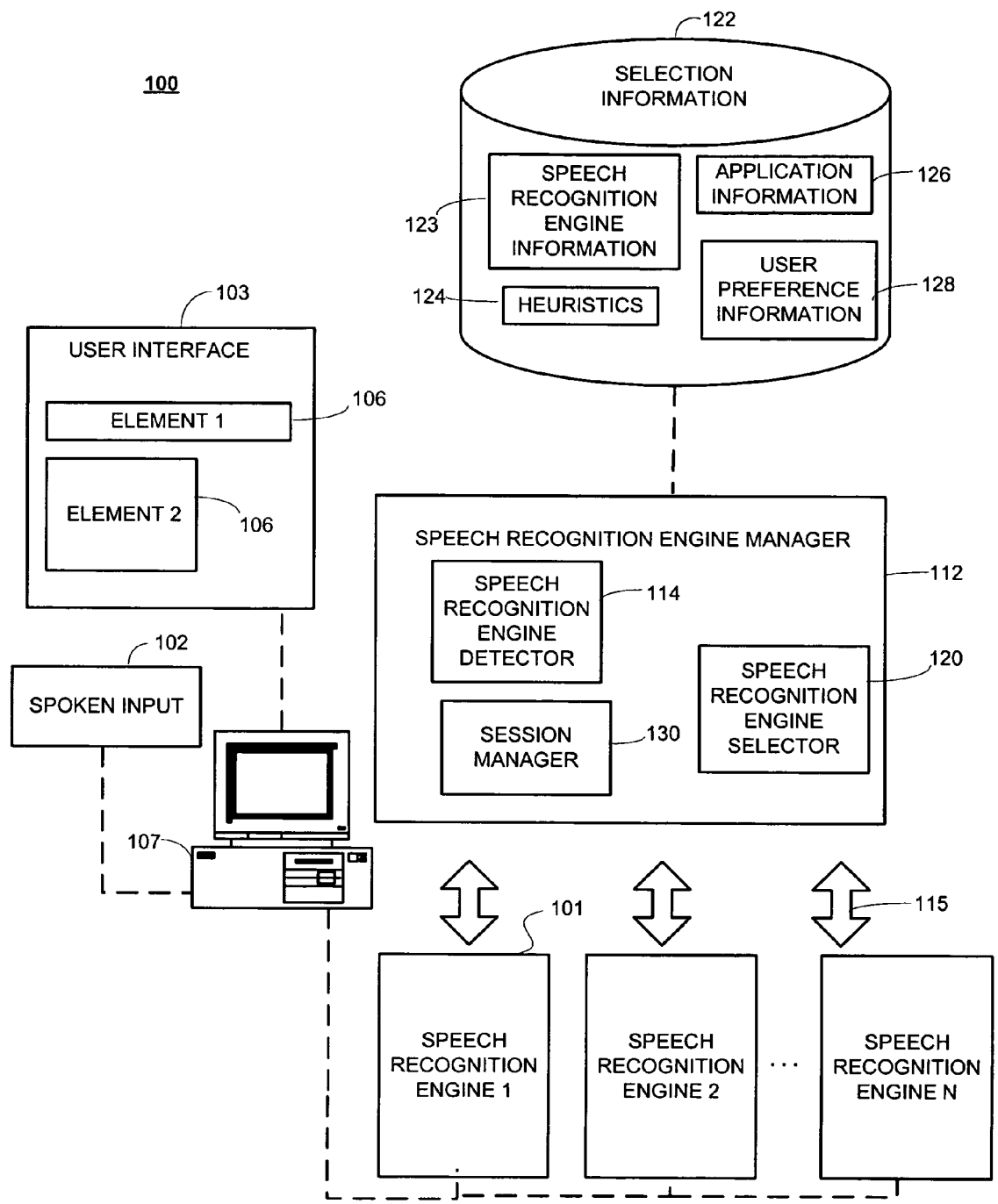
FIG. 1 is a block diagram of a system for supporting multiple speech recognition engines.

FIG. 1 illustrates a block diagram of a system 100 for supporting multiple speech recognition engines 101. The speech recognition engines 101 may be one of a variety of conventional speech recognition engines, such as, for example, IBM® ViaVoice®, RealSpeak®, DynaSpeak®, and Dragon Naturally Speaking®.

The speech recognition engines 101 are operable to recognize spoken input 102 received via a voice-enabled user interface 103. Specifically, the user interface 103 includes interface elements 106 that may be selected, activated, or implemented using the spoken input 102. The interface elements 106 may include, for example, text fields, password fields, checkboxes, radio buttons, and control buttons (e.g., submit and reset buttons). Although, for the sake of brevity, only one user interface 103 is displayed, multiple voice-enabled user interfaces associated with one or more applications may be included in the system 100.

The spoken input 102 relates to a stream of speech uttered by a user. The spoken input 102 may be, for example, voice commands relating to accessing portions of the user interface 103. As another example, the spoken input 102 may represent dictated text to be entered into one or more of the interface elements 106. For the sake of brevity, only two interface elements 106 are depicted in the system 100; however, it should be understood that the system 100 may be implemented with the user interface 103 having multiple interface elements, and/or with multiple user interface types.

Particular speech recognition engines 101 may be better suited to process the spoken input 102 associated with particular environments and/or particular tasks. For example, DynaSpeak® is designed for use on a mobile device. As another example, IBM ViaVoice® may have better dictation recognition than other speech recognition engines that are available at a particular time within the system 100. Additionally, it may be the case that a particular user prefers one type of speech recognition engine to another, in general and/or for a particular task(s). If more than one user is authorized to use the system 100, each user may have a different preference in this regard.

In the illustrated example, the speech recognition engines 101 are associated with a client computer 107. The client computer 107 may be used to access the user interface 103. In particular, it should be understood that the client computer 107 may use, or be associated with, a microphone(s) or other physical element for capturing the spoken input 102.

Although depicted, for the sake of brevity, as a single computer, the client computer 107 may be, for example, multiple computers of the same user(s) that are networked together. The client computer 107 may be a general-purpose computer that is capable of operating as a client of a user interface (e.g., a desktop personal computer, a workstation, or a laptop computer running an application program), or a more special-purpose computer (e.g., a device specifically programmed to operate as a client of a particular application program).

In one implementation, the speech recognition engines 101 may be stored locally on the client computer 107. In another implementation, the speech recognition engines 101 may be stored remotely, for example, on a server computer that is separate from the client computer 107. A network connection may be used to access the speech recognition engines 101. The network connection may use one of a variety of established networks, such as, for example, the Internet, a Public Switched Telephone Network (PSTN), the world wide web (WWW), a wide-area network ("WAN"), a local-area network ("LAN"), or a wireless network.

The system 100 also includes a speech recognition engine manager 112, also referred to as an engine manager 112. The engine manager 112 is operable to manage the speech recognition engines 101, such that a particular speech recognition engine may be selected from the speech recognition engines 101 to complete a particular task.

The engine manager 112 includes a speech recognition engine detector 114. The speech recognition engine detector 114 is operable to determine locations and features of the speech recognition engines 101. In one implementation, the speech recognition engine detector 114 may determine that speech recognition engines 1 through N are available for use by the system 100 for processing the spoken input 102.

An interface or interfaces, represented by the arrows 115, may be used by the engine manager 112 to interact with the speech recognition engines 101. One example of an interface which may be used to interact with the speech recognition engines 101 is an application program interface (API). The interfaces may be used in receiving and/or transferring information from the engine manager 112 to the speech recognition engines 101.

The engine manager 112 includes an engine selector 120. The engine selector 120 may be used to select one or more of the speech recognition engines 101 to be used in recognizing the spoken input 102. In conjunction with selecting one of the speech recognition engines 101 for use, the engine selector 120 may access selection information 122.

The selection information 122 includes various criteria and information for selecting a particular one of the speech recognition engines 101. For example, the selection information 122 may include speech recognition engine information 123, which relates to characteristics of the available speech recognition engines 101. The speech recognition engine information 123, may be collected, in part, by the engine detector 114, or may be input separately by a user.

Heuristics 124 also are included in the selection information 122. The heuristics 124 generally relate to logistical information to be used by the speech recognition engine selector 120 in selecting a speech recognition engine for use. For example, in one implementation, the heuristics 124 may include predetermined criteria relating to selecting a search recognition engine, such as, for example, whether a particular one of the speech recognition engines 101 is suitable for use with a particular device or application, such as a mobile device/application.

The heuristics 124 may be determined using a number of different techniques. For example, the heuristics 124 may be developed in association with information gathered from user studies. In one implementation, a number of users studies may be conducted to determine which speech recognition engine 101 achieves the best results with a particular application, or with users having a particular type of accent or speaking pattern.

As another example, the heuristics 124 also may relate to which of the search recognition engines 101 are better suited to processing spoken input associated with particular types of interface elements. For example, it may be determined that a particular one of the speech recognition engines 101 is best-suited for use with an open interaction element of the user interface 103 that is designed to receive dictation.

Somewhat similarly, the heuristics 124 may be used to relate types of speech recognition with particular speech recognition engines. For example, if the speech recognition engine selector 120 determines that the task at hand involves one of, for example, command and control language, a dictation task, or extendable mark-up language (xml)/context-free grammar (cfg) grammar, or some other specific type of speech recognition task, then the speech recognition engine selector 120 may look to the heuristics 124 to determine which of the speech recognition engines 101 is best suited for that task.

The heuristics 124 may be determined dynamically and built over time, as the system 100 keeps track of which speech recognition engines are better suited to particular environments or tasks. For example, the heuristics 124 may track which of the speech recognition engines 101 is best at recognizing a particular user's voice. In this example, the best-suited speech recognition engine may be the speech recognition engine with fewer misrecognitions, over time, of spoken input issued by a user.

The selection information 122 also includes application information 126 relating to a particular application being used. For example, the application information 126 may store information about applications such as word processing software, internet browsers, or other types of applications, including the user interface 103. The application information 126 thus generally includes information about the application(s) that may be useful in selecting a particular one of the speech recognition engines 101 for use with that application. For example, the application information 126 may include features and configuration information regarding the elements 106 in the user interface 103.

The selection information 122 also includes user preference information 128. User preference information 128 may relate to a user's determination of preferred speech recognition engines for use in an application. The user preference information 128 may simply be received from a user prior to the user making use of the system 100. Alternatively, the user preference information may be tracked over time, so that, for example, if a particular user consistently uses a particular speech recognition engine for a particular task, then that engine may be automatically selected when the user initiates that task.

It should be understood that the selection information 122, just described, may take many forms and may be implemented in a variety of manners to provide the speech recognition engine selector 120 with useful information in selecting an appropriate one of the speech recognition engines 101. Also, the selection information 122 may be stored in a database, configured for storage in a hard drive file system, or stored in other available memory. The selection information 122 may be a part of the engine manager 112, or may be stored separately from the manager 112 (and accessed using a network connection).

Although specific types of selection information 122 are described above, e.g., speech recognition engine information 123, heuristics 124, application information 126, and user preference information 128, it should be understood that these designations are merely examples, and other designations or types of selection information may be used. For example, certain types of heuristics 124 and application information 126 or user preference information 128 may overlap with one another in terms of the type(s) of information stored under those headings.

The engine manager 112 further includes a session manager 130. As described in more detail below, the session manager 130 is operable to manage sessions between the engine manager 112 and the available speech recognition engines 101. The sessions may be implemented as channels for data communication, where a session is established between the engine manager 112 and each of the speech recognition engines 101. In the example of FIG. 1, there may be 1 through N sessions, each session corresponding to each search recognition engine 1 through N. Additionally, the session manager 130 may be used to manage multiple sessions with a single one of the speech recognition engines 101, if the speech recognition engine supports this functionality.

Based on the above description, it should be understood that the system 100 may use the speech recognition engine selector 120 to select one or more of the detected available speech recognition engines 101, to be used in recognizing the spoken input 102. By using the selection information 122, the engine selector 120 may select an optimal one of the speech recognition engines 101. Specifically, the speech recognition engine information 123, the heuristics 124, the interface information 126, and the user preference information 128 may be used alone or in combination to select the search recognition engine to be used in recognizing the spoken input 102.

Figure 2:
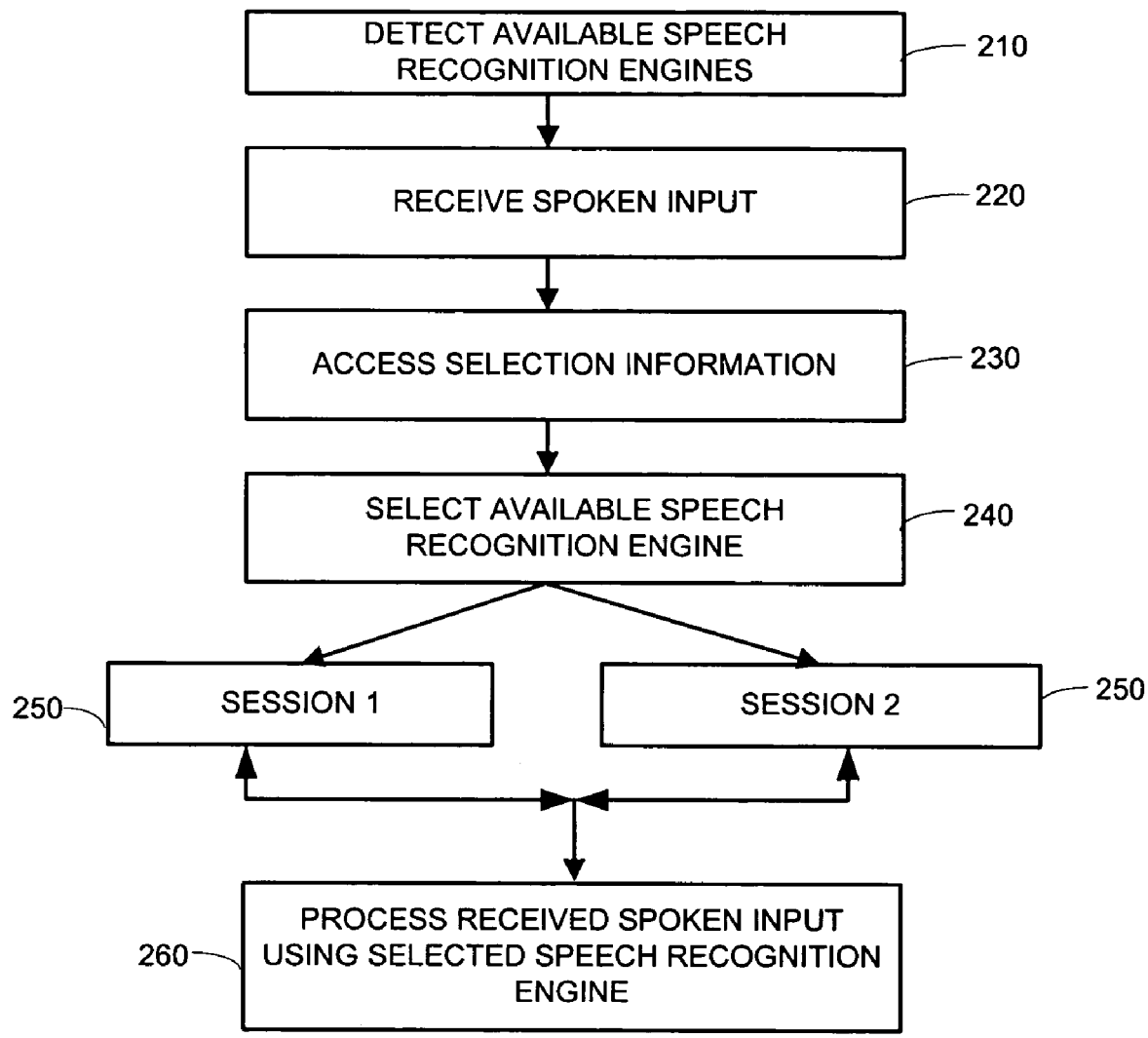
FIG. 2 is a flow chart illustrating a process for supporting multiple speech recognition engines.

FIG. 2 is a flow chart illustrating a process 200 for supporting multiple speech recognition engines. The process 200 may be executed by, for example, the system 100 of FIG. 1. The system executing the process 200 may include one or more voice-enabled user interfaces associated with one or more applications.

The process 200 begins by detecting available speech recognition engines for use by the system implementing the process 200 (210). For example, it may be detected that particular speech recognition engines 101 are available for use with a particular application(s). As referred to above, detected features and location information of the detected available speech recognition engine(s) may be stored in the selection information 122 as the speech recognition engine information 123.

The process 200 continues with receipt of spoken input 102 (220). In one implementation, the spoken input 102 may relate to selecting, activating, or implementing a portion of a user interface. For example, the system 100 implementing the process 200 may receive the spoken input "access name field." The selection information 122 is then accessed (230). As already discussed, the selection information also may include heuristics 124 and user preference information 128 related to the execution of tasks associated with particular user interfaces, particular applications, and/or particular detected speech recognition engines 101.

Based on the received spoken input, and using portions of the accessed selection information alone or in combination, an available speech recognition engine best suited to process the spoken input is selected (240). A session associated with the selected speech recognition engine is created or otherwise accessed (250).

The received spoken input 102 may be transferred to the selected speech recognition engine using the accessed session. The received spoken input is then processed using the selected speech recognition engine (260). It should be understood that user may switch back and forth between the sessions, as needed, and the session manager 130 is operable to maintain session information so as to maintain each session, as required by the user. If a third session is required by the user, the process 200 may continue with the selection of an appropriate one of the speech recognition engines 101.

Figure 3:
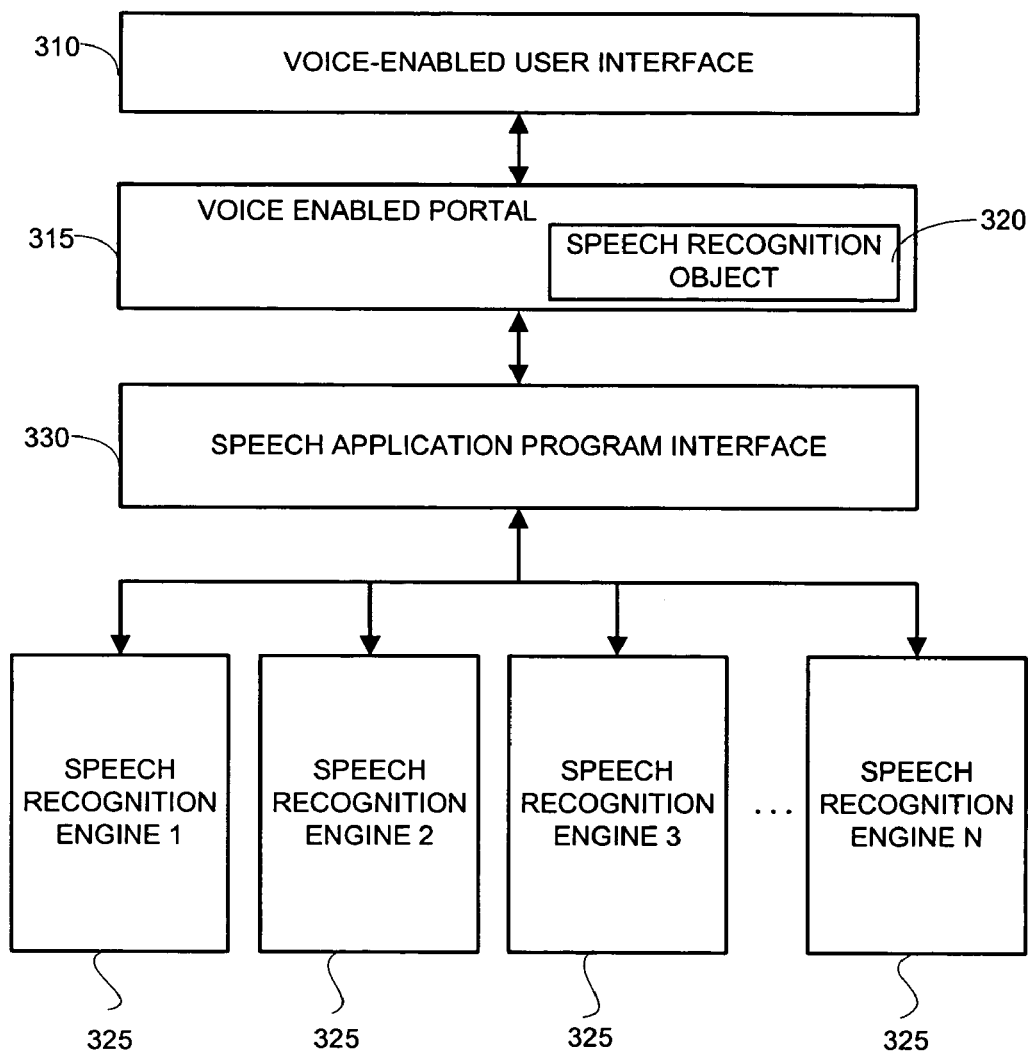
FIG. 3 is an example of an architecture of the system of FIG. 1.

FIG. 3 is an example of an architecture 300 of the system of FIG. 1. The architecture 300 includes a voice-enabled user interface 310. Again, for the sake of brevity, only one user interface 310 is depicted, although multiple user interfaces may be included in the architecture 300.

The user interface 310 may be associated with an application. Using a voice-enabled portal 315, spoken input may be processed and converted to text that the application can understand. The voice-enabled portal 315, generally speaking, represents a software application that allows a portal, e.g., a web site or network service designed to provide resources to users, to provide efficient voice-enabled navigation and data entry, while at the same time handling ambiguities found in a complex portal environment. For example, the voice-enabled portal 315 may allow a user to distinguish between two identical or similar elements of a web page, so as to enter information about a selected one of the two.

The voice-enabled portal 315 creates a speech recognition (SR) object 320 to manage interactions with speech recognition engines 325, which, as with the speech recognition engines 101, may be used to process received spoken input. The speech recognition object 320 uses a speech recognition application program interface (API) 330 to interact with the speech recognition engines 325.

In one implementation, the SR object 320 represents a session with a particular one of the speech recognition engines 325 through which spoken input may be processed and converted to text. The portal 315 uses the SR object 320 to manage the activities for such speech recognition, including, for example, what resources are available for use by one of the speech recognition engines 325. For example, a particular one of the speech recognition engines 325 may be best-suited for a particular application or user; however, if insufficient memory is available for use by that speech recognition engine, then the SR object 320 may utilize a different one of the speech recognition engines 325, that requires less memory to function.

Based on the above, it should be understood that the voice-enabled portal 315 and/or the SR object 320 are operable to implement most or all of the functions of the speech recognition engine manager 112 and selection information 122 of FIG. 1. In one mode of operation, the voice-enabled portal 315 may parse the interface 310, resulting in a vocabulary of possible spoken input associated with accessing interface elements of the interface 310. Using selection information, such as the selection information 122 of FIG. 1, the SR object 320 may be used to associate particular speech recognition engines with the user interface 310, or with particular interface elements thereof.

For example, using the API 330, the SR object 320 may register a defined vocabulary or grammar that is pre-associated with an interface element with the particular one of the speech recognition engines 325 that is to be used to process the spoken input associated with that interface element. When the spoken input is received at the voice-enabled portal, the spoken input is directed to the associated speech recognition engine.

As described in more detail below with respect to FIG. 5, the SR object 320 receives a callback function to be executed by the voice-enabled portal 315, in response to receipt of the spoken input. In this way, i.e., using event callbacks, the voice-enabled portal 315 receives recognized speech from the speech recognition engine 325 as text. The voice-enabled portal 315 also may receive notifications of other processing states (e.g., a current status of a speech recognition task, or information about a current session being managed) through the use of such event callbacks.

Figure 4:
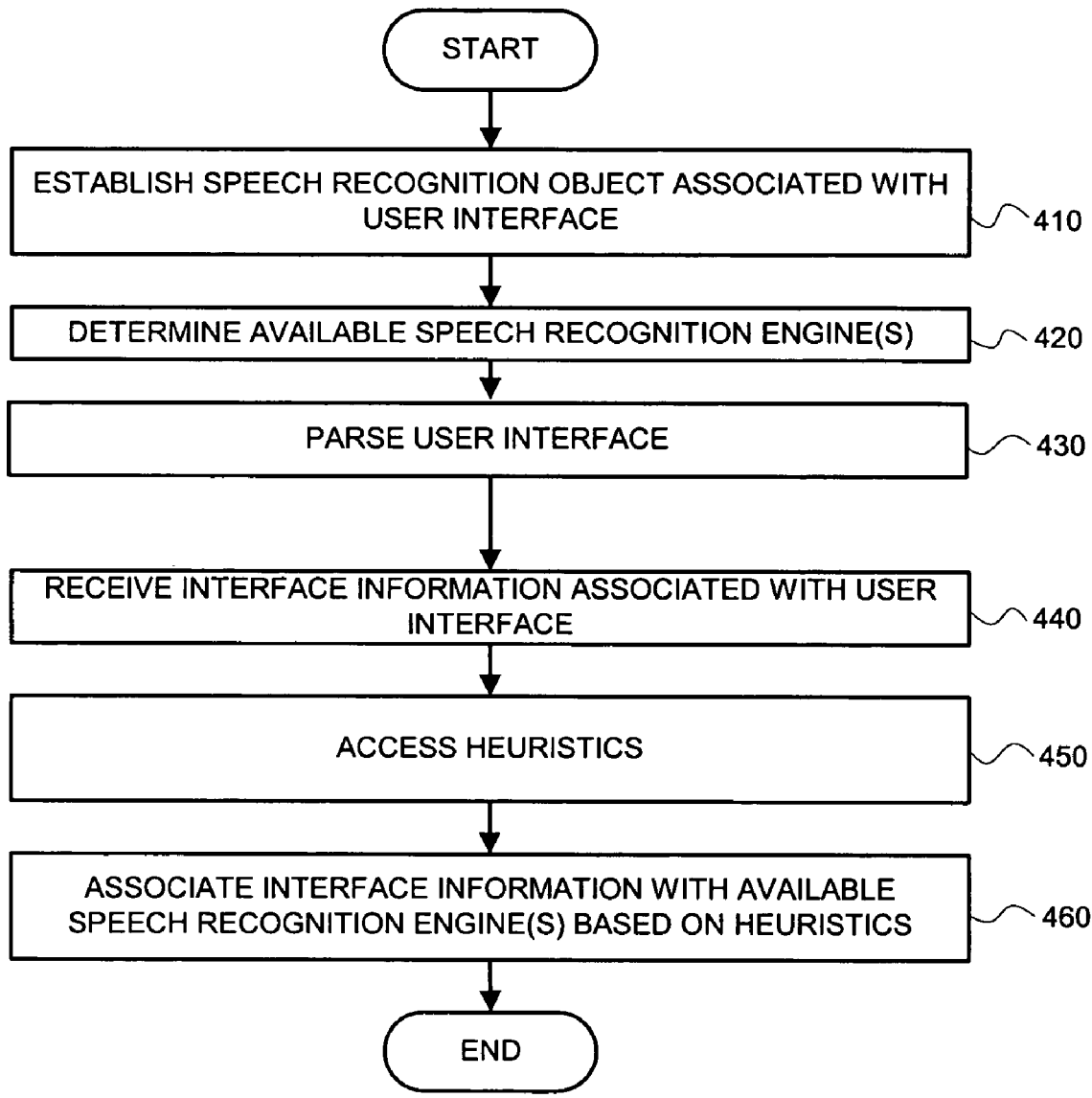
FIG. 4 is a flow chart illustrating a process for selecting a speech recognition engine using the architecture of FIG. 3.

FIG. 4 is a flow chart illustrating a process 400 for selecting a speech recognition engine. As referred to above, one issue that exists when supporting multiple speech recognition engines is the selection of a particular one of the engines for a task at hand. The process 400 provides an example of this issue in more detail, in the context of the system 300 of FIG. 3. Of course, the process 400, or a similar process, also may be executed by a process of other systems, such as, for example, the system 100 of FIG. 1.

The process 400 begins by establishing an SR object associated with a voice-enabled user interface (410). For example, such an SR object may be invoked and associated with an interface, upon an opening of the interface, or upon selection of a particular element associated with the interface. Available speech recognition engines are detected for use in processing spoken input by the system (420).

The user interface is parsed (430), resulting in user interface information, and the user interface information is received (440) at the SR object. Heuristics associated with the user interface and the available speech recognition engines are accessed (450) by the SR object, and the interface information is associated with available speech recognition engines based on the heuristics (460).

Figure 5:
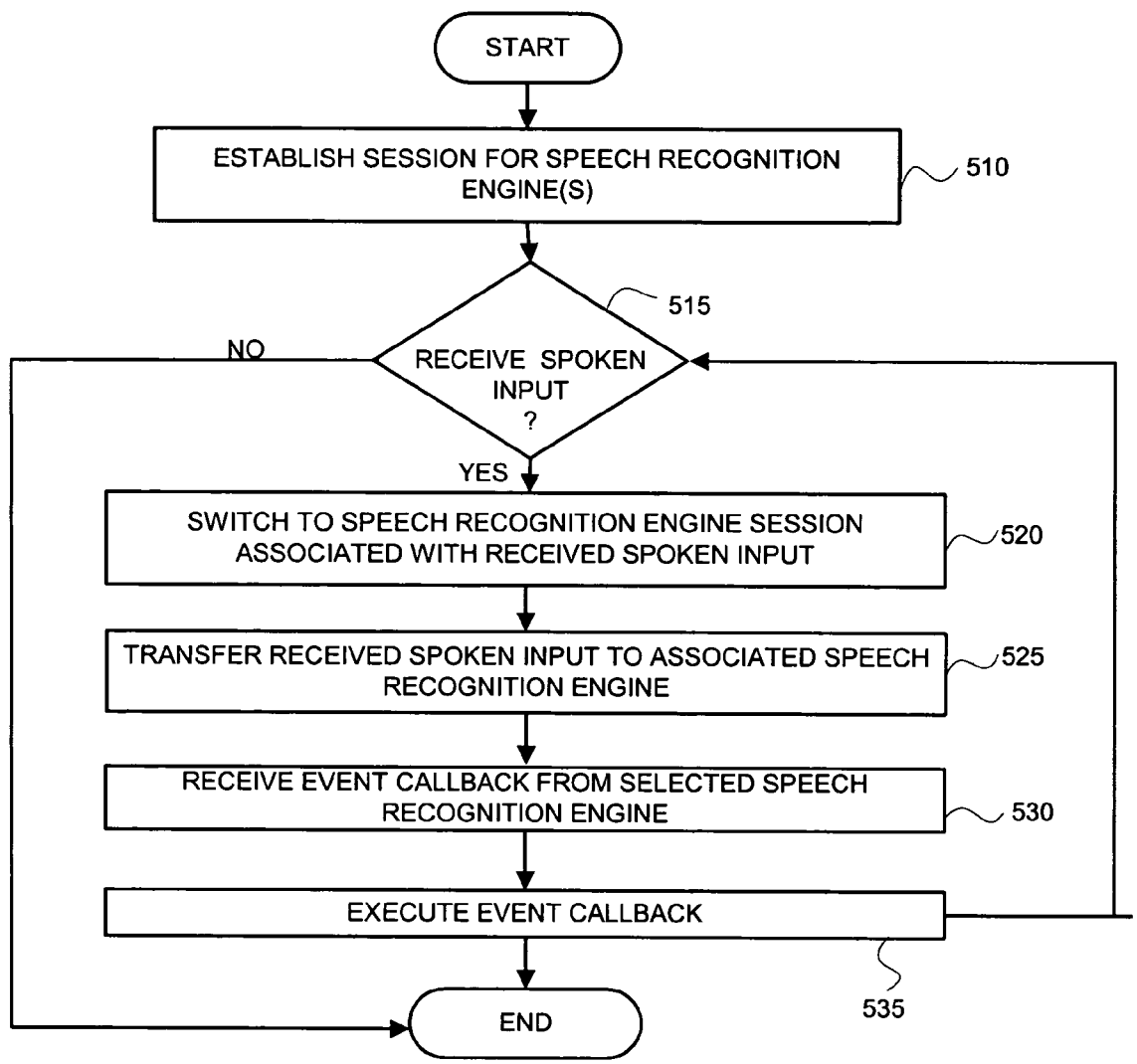
FIG. 5 is a flow chart illustrating a process for supporting multiple speech recognition engines using the architecture of FIG. 3.

FIG. 5 is a flow chart illustrating a process 500 for supporting multiple speech recognition engines. That is, as just described with respect to the example of FIG. 4, one of a plurality of speech recognition engines 325 may be selected for a particular task and/or in a particular environment. However, as referred to above, it also may be the case that multiple ones of the plurality of speech recognition engines 325 are each simultaneously maintained and associated with a defined session. In this way, a user may switch from one speech recognition engine to another while executing a plurality of tasks or while using a plurality of applications, so that a preferred engine is always being used, without having to repetitively perform tasks associated with the detection, initialization, or selection of the preferred engine.

The process 500 provides an example of this issue in more detail, in the context of the system 300 of FIG. 3. Of course, the process 500, or a similar process, also may be executed by a process of other systems, such as, for example, the system 100 of FIG. 1.

The system executing the process 500 may include one or more voice-enabled user interfaces associated with one or more applications. Specifically, the voice-enabled portal 315 having the SR object(s) 320, as described above with respect to FIG. 4, is assumed to be properly associated with each of a plurality of the available speech recognition engines 325. For example, multiple SR objects 320 may be invoked as channels between the voice-enabled portal 315 and corresponding ones of the speech recognition engines 325.

The process 500 begins with establishing a session associated with each of the speech recognition engine(s) (510), perhaps in association with the selection of the speech recognition engine(s). When spoken input is received (515), the speech recognition engine session associated with the received spoken input is selected (520), and the received spoken input is transferred to the associated speech recognition engine (525), via the (corresponding) SR object 320.

The selection of a particular session may be based on a number of factors or combinations thereof, such as, for example, the currently-active interface element, a user selection/preference, or heuristics. In particular, much or all of the selection information 122 of the system 100 of FIG. 1 may be used to select a particular session. For example, the session manager 130 may be aware that a first speech recognition engine was selected for its abilities in interpreting dictation from the user, while a second speech recognition engine was selected for its abilities in taking navigation commands from the user in the context of a web interface. As a result, if the user switches from dictating text to navigating a web interface, then the session manager may switch from a first session with the first speech recognition engine to a second session with the second speech recognition engine.

Based on the received spoken input, an event callback is received from the speech recognition engine to which the spoken input was transferred (530), and the event callback is executed (535). In this way, for example, the voice-enabled portal 315 receives the spoken input as text to be associated with the currently-selected interface element.

The above description provides examples of a system having multiple speech recognition engines operable to recognize spoken data, a user interface for receiving spoken input from a user, and a speech recognition engine manager that detects all of, and selects one of, the speech recognition engines for recognizing the spoken input from the user. In this way, a speech recognition engine that is particularly suited to a current environment may be selected. For example, a speech recognition engine that is particularly suited for, or preferred by, the user may be selected, or a speech recognition engine that is particularly suited for a particular type of interface, interface element, or application, may be selected.

Multiple ones of the speech recognition engines may be selected and simultaneously maintained in an active state, by maintaining a session associated with each of the engines. In one implementation, a voice-enabled portal associated with, for example, a web browser, may be used together with a speech recognition object to select and communicate with the speech recognition engines. In this way, users' experience with voice applications may be enhanced, and, in particular, users with physical disabilities that have difficulty with traditional data entry methods may more easily interact with software applications.

A number of implementations have been described. Nevertheless, it will be understood that various modifications may be made. For example, various operations in the disclosed processes may be performed in different orders or in parallel, and various features and components in the disclosed implementations may be combined, deleted, rearranged, or supplemented. Accordingly, other implementations are within the scope of the following claims.

What is claimed is:

1. A system comprising:
   a plurality of available speech recognition engines configured to interpret spoken input, if selected as a chosen speech recognition engine;
   a user interface configured to receive the spoken input; and
   a speech recognition engine manager configured to:
      dynamically build heuristics relating to a quantity of misrecognitions of past spoken input of a particular user over time by the available speech recognition engines,
      track user preference information over time relating to a preferred speech recognition engine of the particular user for use in an application; and
      select, based on the dynamically built heuristics, the tracked user preference information, and further based on receiving spoken input via the user interface, the chosen speech recognition engine from amongst the available speech recognition engines.

2. The system of claim 1 wherein the speech recognition engine manager further comprises a speech recognition engine detector operable to detect the plurality of available speech recognition engines.

3. The system of claim 1 wherein the speech recognition engine selector is operable to select the chosen speech recognition engine based on selection information.

4. The system of claim 3 wherein the selection information further comprises the dynamically built heuristics.

5. The system of claim 4 wherein the dynamically built heuristics relate to a type of speech recognition associated with the plurality of available speech recognition engines.

6. The system of claim 3 wherein the selection information includes information related to the user interface with respect to the plurality of available speech recognition engines.

7. The system of claim 1 wherein the speech recognition engine manager uses application program interface (API) libraries to interact with the plurality of available speech recognition engines.

8. The system of claim 1 wherein the speech recognition engine manager further comprises a session manager operable to manage a first session with a first speech recognition engine and a second session with a second speech recognition engine, where the first and second session overlap in time.

9. A computer-implemented method comprising: determining available speech recognition engines;
   dynamically building heuristics relating to a quantity of misrecognitions of past spoken input of a particular user over time by the available speech recognition engines;
   tracking user preference information over time relating to a preferred speech recognition engine of the particular user for use in an application;
   receiving spoken input via a user interface;
   selecting, based on the dynamically built heuristics, the tracked user preference information, and further based on receiving spoken input via the user interface, a chosen recognition engine from amongst the available speech recognition engines; and
   interpreting the spoken input using the chosen speech recognition engine.

10. The method of claim 9 wherein selecting the chosen speech recognition engine includes accessing selection information associated with the particular user, the user interface, or the available speech recognition engines.

11. The method of claim 9 further comprising: selecting a plurality of the available speech recognition engines; and maintaining a session for each of the selected plurality of available speech recognition engines.

12. The method of claim 9 comprising forwarding the interpreted spoken input to the user interface via a voice-enabled portal, so that the interpreted spoken input is displayed as text in association with the user interface.

13. The method of claim 9, wherein the chosen speech recognition engine is selected if the spoken input is received from the particular user.

14. A computer program product, tangibly embodied in a machine readable medium, the computer program product comprising instructions that, when read by a machine, operate to cause data processing apparatus to:
   determine available speech recognition engines;
   dynamically build heuristics relating to a quantity of misrecognitions of past spoken input of a particular user over time by the available speech recognition engines;
   track user preference information over time relating to a preferred speech recognition engine of the particular user for use in an application;
   receive spoken input via a user interface;
   select, based on the dynamically built heuristics, the tracked user preference information, and further based on receiving spoken input via the user interface, a chosen speech recognition engine from amongst the available speech recognition engines; and interpret the spoken input using the chosen speech recognition engine.

15. The computer program product of claim 14 wherein selecting the chosen speech recognition engine includes accessing selection information associated with the particular user, the user interface, or the available speech recognition engines.

16. The computer program product of claim 14 further comprising instructions that, when read by a machine, operate to cause data processing apparatus to:

select a plurality of the available speech recognition engines; and maintain a session for each of the selected plurality of available speech recognition engines.

17. The computer program product of claim 14 further comprising instructions that, when read by a machine, operate to cause data processing apparatus to forward the interpreted spoken input to the user interface via a voice-enabled portal, so that the interpreted spoken input is displayed as text in association with the user interface.

* * * * *